United States Patent [19]
Bennington

[11] 3,711,680
[45] Jan. 16, 1973

[54] WORKPIECE TRANSFER APPARATUS
[75] Inventor: C. Earl Bennington, Lapeer, Mich.
[73] Assignee: Voplex Corporation, Rochester, N.Y.
[22] Filed: March 18, 1971
[21] Appl. No.: 125,545

[52] U.S. Cl. ............................. 219/243, 93/DIG. 1
[51] Int. Cl. .............................................. H05b 1/00
[58] Field of Search ......... 219/243; 214/1.4, 1.5, 1.6; 18/16 R, 16 F, 16 H; 25/1 D; 53/DIG. 1; 93/DIG. 1; 156/516, 538, 566; 83/78-80

[56] References Cited

UNITED STATES PATENTS 2,321,252   6/1943   Sayre........................................18/16

Primary Examiner—C. L. Albritton
Attorney—Harness, Dickey & Pierce

[57] ABSTRACT

An apparatus for transferring workpieces to and from a machine adapted to perform a manufacturing operation thereon, the apparatus including means defining a workpiece transfer path to and from the machine, shuttle means for moving workpieces longitudinally along the path into registry with the machine, with longitudinal movement of workpieces along the path in response to movement of the shuttle means causing preceding workpieces to be moved out of registry with the machine and toward a discharge area, and means for removing workpieces from the discharge area in a manner so as to prevent interference with the transfer of successive workpieces into registry with the machine.

18 Claims, 6 Drawing Figures

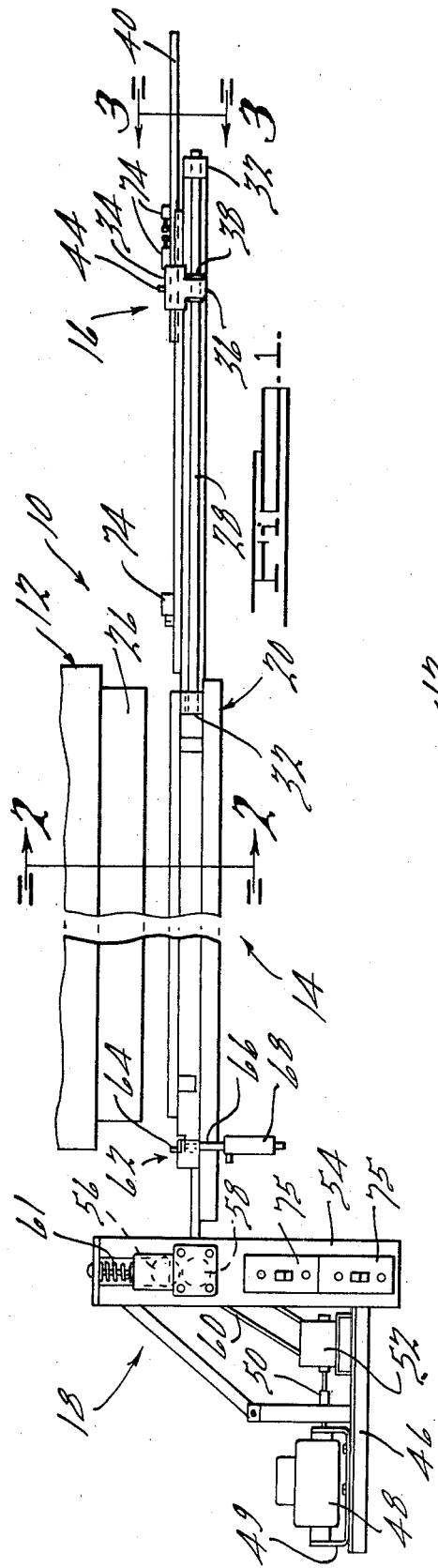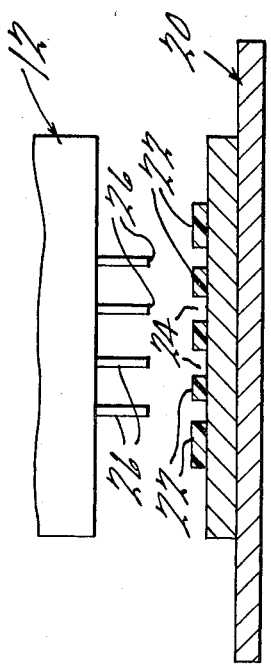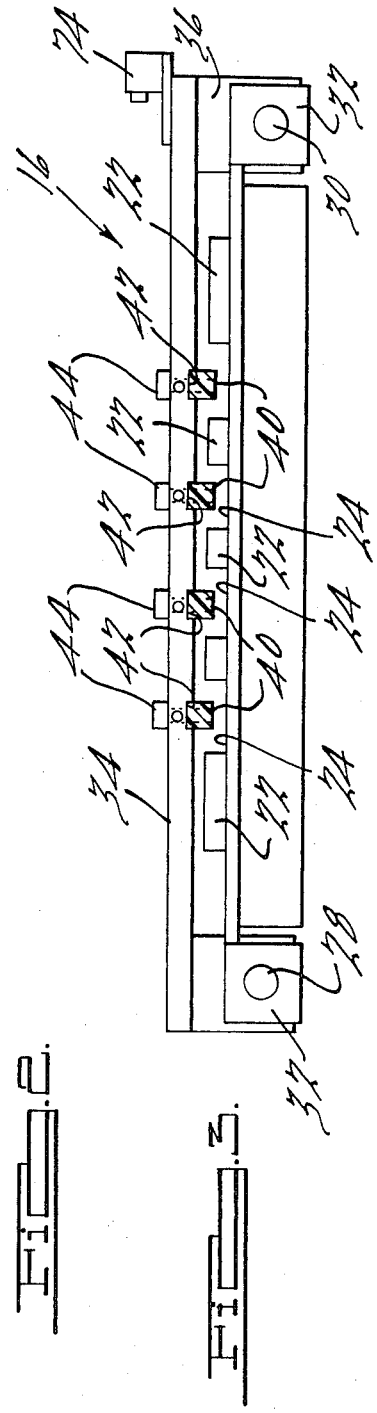

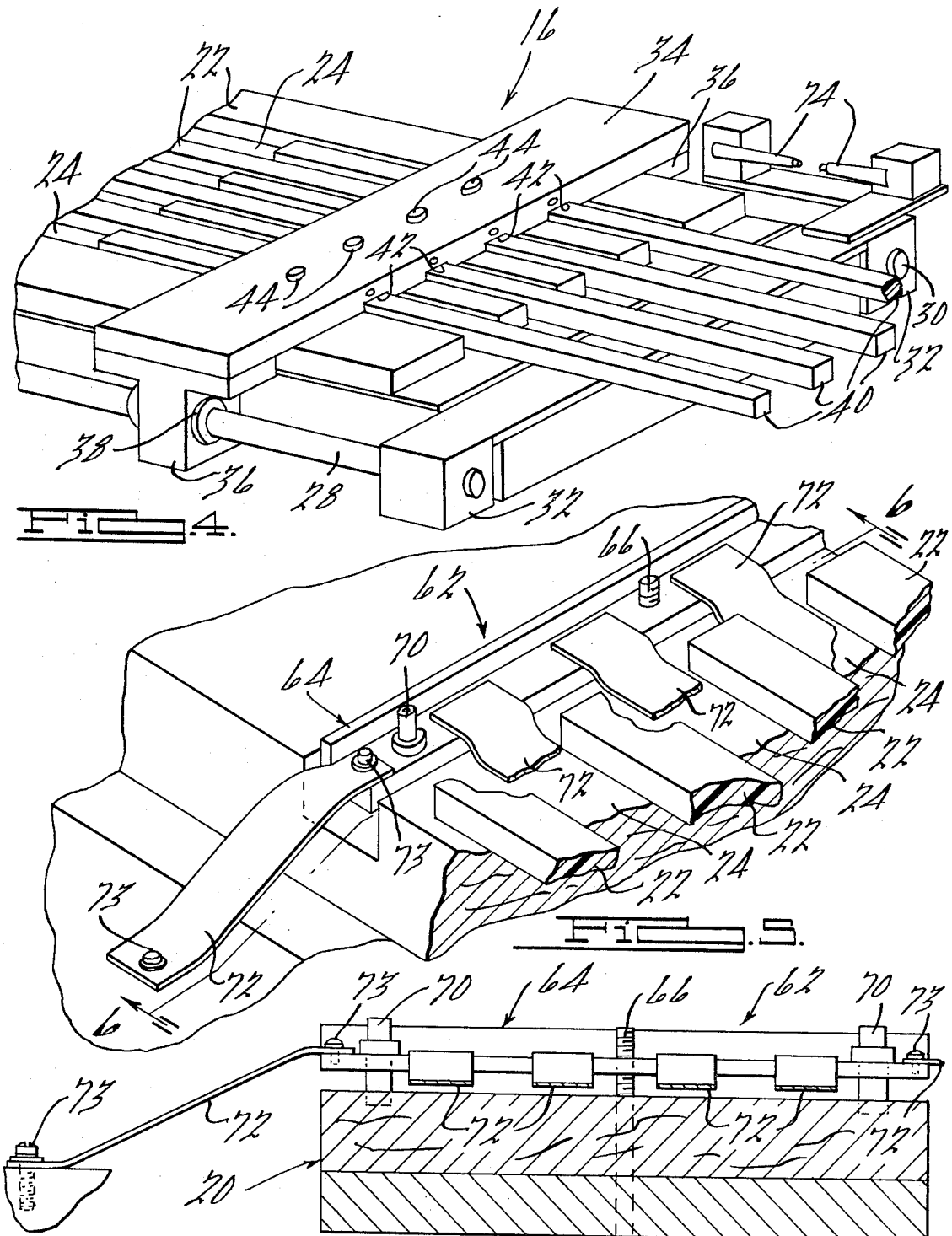

3,711,680

WORKPIECE TRANSFER APPARATUS

SUMMARY OF THE INVENTION

This invention relates generally to a workpiece transfer apparatus, and more particularly, to a new and improved transfer apparatus adapted for operative association with workpiece sealing machines of the type generally referred to as dielectric sealing machines. The workpiece transfer apparatus of the present invention is particularly adapted to overcome a number of problems encountered in prior known workpiece handling equipment used with dielectric sealing machines, such problems resulting primarily from the fact that an operator has had to wait until a sealing operation or cycle was completed before the machine could be loaded for the next successive operational cycle. Additional problems have been caused by the fact that available work space in dielectric sealing machines has traditionally been limited, thereby rendering loading and unloading quite difficult, to say nothing of the difficulties in connection with adjusting the workpiece positioning or fixture means necessitated by a change in workpiece size.

It is accordingly a general object of the present invention to provide a new and improved workpiece transfer apparatus which overcomes the aforesaid problems.

It is a more particular object of the present invention to provide a new and improved workpiece transfer apparatus which is adapted for feeding multiple workpieces during each operational cycle thereof.

It is another object of the present invention to provide a new and improved workpiece transfer apparatus which may be easily adjusted to handle a wide range of workpiece sizes, and which utilizes feeding movement of one plurality of workpieces to effect removal of another plurality of workpieces from the associated dielectric sealing machine.

It is another object of the present invention to provide a workpiece transfer apparatus of the above described type which properly positions and holds the workpieces, and which allows for the loading of the apparatus concurrently with the sealing operation.

It is another object of the present invention to provide a workpiece transfer apparatus which may be easily adjusted and which, although particularly being adapted for use with dielectric sealing machines, may find universality of application in related or unrelated areas of manufacture.

It is still another object of the present invention to provide a workpiece transfer apparatus which is of a relatively simple design, is economical to manufacture, and will have a long and effective operational life.

Other objects and advantages of the present invention will become apparent from the following detailed description taken in conjunction with the accompanying drawings.

BRIEF DESCRIPTION OF THE DRAWINGS

FIG. 1 is a longitudinal side elevation view, partially broken away, of the workpiece transfer apparatus of the present invention;

FIG. 2 is an enlarged transverse cross-sectional view taken substantially along the line 2—2 of FIG. 1;

FIG. 3 is an enlarged transverse cross-sectional view taken substantially along the line 3—3 of FIG. 1;

FIG. 4 is an enlarged fragmentary elevated perspective view of the shuttle feeding mechanism incorporated in the workpiece transfer apparatus of the present invention;

FIG. 5 is a fragmentary elevated perspective view of the workpiece stop and ground mechanism incorporated in the transfer apparatus of the present invention, and FIG. 6 is a cross-sectional view taken substantially along the line 6—6 of FIG. 5.

DETAILED DESCRIPTION OF A PREFERRED EMBODIMENT

Referring now in detail to the drawings and in particular to FIG. 1, a workpiece transfer apparatus 10, in accordance with an exemplary embodiment of the present invention, is shown in operative association with a dielectric sealing machine 12 and is adapted to generally function in selectively transferring or conveying successive workpieces to and from the machine 12 in order to have a sealing operation performed thereon. The apparatus 10 generally comprises a workpiece or conveying structure 14 and a shuttle feeding mechanism 16. Additionally, the apparatus 10 comprises a workpiece pullout mechanism 18 located at the opposite side of the machine 12 from the structure 14. As will hereinafter be described in detail, a series of workpieces are adapted to be placed upon the structure 14, after which time the shuttle feeding mechanism 16 is actuated to transfer the workpieces into registry with the machine 12. Workpieces which were previously transferred to the machine 12 are simultaneously conveyed or transferred out of registry with the machine 12 and into operative engagement with the pullout mechanism 18 which functions to rapidly transfer these workpieces to an associated conveyor assembly or the like where the same may be transferred to some predetermined operative destination.

With reference particularly to the conveying structure 14, as best seen in FIGS. 1 and 2, the structure 14 comprises an elongated, generally horizontally disposed base structure 20, the upper side of which is provided with a plurality of longitudinally extending, laterally spaced parallel guide members 22 which define workpiece receiving channels or troughs 24 therebetween. The base structure 20 is preferably fabricated of wood or a similar economical non-conductive material, whereas the guide members 22 are preferably, although not necessarily, fabricated of Nylon. As will later be described, workpieces are adapted to be placed within the channels 24 and be biased longitudinally thereof into registry with the machine 12, and in particular, into registry with a plurality of laterally spaced sealing bars 26 which are disposed above and laterally aligned one with each of the channels 24, as best seen in FIG. 2.

The shuttle feeding mechanism 16 serves the general function of selectively transferring or conveying workpieces along the channels 24 and toward this end, the mechanism 16 comprises pair of laterally spaced, longitudinally extending guide rods 28 and 30 which are arranged adjacent the laterally opposite sides of the base structure 20 and extend longitudinally thereof, as best seen in FIGS. 1, 3 and 4. The guide rods 28, 30 are operatively secured to the base structure 20 by means of longitudinally spaced support blocks 32, and the guide rods 28, 30 are thereby adapted to operatively support a longitudinally slidable, laterally extending shuttle bar 34. As seen in FIG. 4, the shuttle bar 34 projects laterally outwardly from the opposite sides of the base structure 20 and the opposite ends thereof are provided with downwardly disposed carriage brackets 36 which are provided with suitable sleeve bushings, bearings or the like 38 adapted to slidably receive the guide rods 28, 30, whereby the shuttle bar 34 may be moved longitudinally of the base structure 20 for purposes later to be described. Together with the shuttle bar 34, the shuttle feeding mechanism 16 comprises a plurality of longitudinally extending, laterally spaced push rods 40, each of which is arranged in longitudinal alignment with one of the longitudinally extending channels 24. The push rods 40 are preferably fabricated of Nylon and are adapted to be nestingly received within suitable upwardly disposed recesses or notches 42 formed in the underside of the shuttle bar 34. Means in the form of suitable adjustment screws, bolts or the like 44 are provided on the shuttle bar 34 in lateral alignment with the recesses 42 and are adapted for adjustable threaded engagement with the push rods 40. With this arrangement, the various push rods 40 may be longitudinally adjusted relative to the shuttle bar 34 in accordance with the size of workpieces which are to be processed by the sealing machine 12.

It will best be seen in FIG. 3 that the push rods 40 extend downwardly into the channels 24 so that the push rods 40 are thereby adapted for engagement with workpieces which have been placed within the channels 24 preparatory to an operational cycle of the machine 12. At such time as it is desired to transfer such workpieces into registry with the machine 12, and in particular, with the sealing bars 26 thereof, the shuttle bar 34 may be biased longitudinally of the base structure 20 or toward the left in FIG. 1. As this occurs, the extreme leftward ends of the push rods 40 will bias the workpieces longitudinally of the channels 24 toward a position in registry with the sealing bars 26, the push rods 40 being properly longitudinally adjusted so that the workpieces are in the desired relation with respect to the machine 12 at the extreme leftward position of the shuttle bar 34 during a shuttle stroke, as will be appreciated by those skilled in the art. It may be noted that the shuttle feeding mechanism 16 may be manually actuated, or alternatively, may be powered by any suitable mechanical means, such as a reciprocable piston and cylinder assembly and/or return counterweight arrangement, or the like, in order to provide any desired degree of automation and to minimize operator effort, as will be appreciated by those skilled in the art.

Referring now to the construction and operation of the workpiece pullout mechanism 18, as best seen in FIG. 1, the mechanism 18 is located on the opposite side of the machine 12 from the shuttle feed mechanism 16 and comprises a generally horizontally disposed support structure 46 which is provided with a suitable drive motor 48 secured by means of a motor mounting bracket 49 to the upper surface of the structure 46. The motor 48 includes an output drive shaft 50 which is drivingly connected to a speed reducing mechanism 52 also mounted upon the structure 46. A generally vertically disposed roller carriage structure 54 is disposed interjacent the structure 46 and the machine 12 and arranged generally in-line with the longitudinal end of the base structure 20. The roller carriage 54 is adapted to journal support upper and lower horizontally extending workpiece pullout rollers 56 and 58, respectively, the latter of which is drivingly connected by a suitable drive belt or the like 60 with the speed reducing mechanism 52. Workpieces are adapted to pass between the rollers 56, 58, and the upper roller 56 is adapted to be spring biased downwardly by means of suitable spring means 61 to assure that workpieces are positively engaged with the driven lower roller 58 and will thereby be pulled out of the machine 12 in much the same way as a roller type wringer mechanism operates on a washing machine. Briefly in operation of the apparatus 10, as workpieces are transferred or conveyed longitudinally of the base structure 20 into registry with the sealing bars 26 of the machine 12, workpieces which were previously subjected to a sealing operation by the machine 12 are pushed or otherwise biased longitudinally toward the left in FIG. 1 by the incoming workpieces. As the extreme left ends of the workpieces being discharged from the machine 12 come into contact with the lower driven roller 58, said workpieces are pulled outwardly by moving interjacent the rollers 56, 58 and are thereby extracted from the machine 12. It will be noted that the lower driven roller 58 is adapted to be rotated at a high enough rate of speed so that the workpieces are pulled out of the machine 12 at a faster rate than the workpieces which are being transferred into registry with the sealing bars 26, whereby to obviate any interference with the transfer of the workpieces into the machine 12. It will be appreciated, of course, that as the workpieces are pulled away from the machine 12 by the mechanism 18, they may be transferred to a suitable associated conveyor belt, packing container, pallet box or the like for purposes of transfer to some future destination.

Referring now to FIGS. 1, 5 and 6, the apparatus 10 is provided with a combination workpiece ground and positioning mechanism, generally designated by the numeral 62, which is located at the end of the base structure 20 opposite the shuttle feeding mechanism 16. Generally speaking, the mechanism 62 is adapted to provide a positive electrical ground for the workpieces being subjected to a dielectric sealing operation by the machine 12, and simultaneously provide a workpiece positioning function for correctly longitudinally positioning the workpieces preparatory to and during a sealing operation. More particularly, the mechanism 62 comprises a laterally extending workpiece stop bar 64 which extends laterally across the entire width of the base structure 20 and is of a generally L-shaped configuration in cross section, as seen in FIG. 5. The bar 64 is adapted to be mounted on the upper end of a generally vertically disposed and reciprocable piston rod 66, the lower end of which is connected to a suitable piston and cylinder assembly 68 which is selectively actuatable in a manner well known in the art to effect upward and downward reciprocable movement of the stop bar 64. The assembly 68 and stop bar 64 are arranged such that when the piston rod 66 is extended, the bar 64 provides a positive stop against which workpieces may be biased or engaged and thereby be properly positioned within the machine 12 for a sealing operation, and when the piston rod 66 is retracted, the stop bar 64 is adapted to move downwardly to permit the workpieces to be moved longitudinally of the channels 24 toward and into engagement with the pullout mechanism 18. Means in the form of suitable laterally spaced, vertically extending guide posts 70 are provided on the base structure 20 and extend upwardly through the stop bar 64 for slidably supporting the same for the aforesaid vertical reciprocable movement. Due to the fact that it is necessary to have the workpieces electrically grounded during operation of the machine 12, a plurality of grounding strips 72 extend between the stop bar 64 and a suitable electrical ground, the strips 72 being operatively secured by means of suitable screws, bolts or the like 73. As illustrated, some of the grounding strips 72 are arranged in longitudinal alignment with the channels 24 along which the workpieces traverse so as to be positively engaged therewith upon abutting engagement of the workpieces with the stop bar 64.

The apparatus 10 may be and preferably is provided with conventional position responsive limiting switch means, representatively designated in the drawings by the numeral 74, which are adapted to function in a manner well known in the art for controlling selective actuation of the piston and cylinder assembly 68 in response to longitudinal sliding movement of the shuttle bar 34, whereby the stop bar 64 will be retracted as new workpieces are moved into registry with the machine 12 to permit the prior workpieces which have already had a sealing operation performed thereon to be biased longitudinally out of the machine 12 and into engagement with the pullout mechanism 18. By virtue of the fact that the details of such limit switches 74, as well as conventional operating control switches designated by the numeral 75, are well known in the art, a detailed description thereof will be omitted for purposes of conciseness.

Referring now to the overall operation of the apparatus 10, assuming the initial conditions that the dielectric sealing machine 12 is energized, that the motor 48 is operating and that the stop bar 64 is disposed in its raised or elevated position, workpieces which are to be dielectrically sealed are placed within the longitudinally extending channels 24. Thereafter, the shuttle bar 34 is biased, either manually or mechanically, toward the left in FIG. 1. As this occurs, the plurality of push rods 40 bias the workpieces toward the left into registry with the plurality of sealing bars 26 on the machine 12, whereby a sealing operation may be performed on the workpieces. As the sealing operation occurs, the shuttle bar 34 may be retracted to the position shown in FIG. 1 so as to permit successive workpieces to be placed into the channels 24. Upon completion of the sealing operation, the shuttle bar 34 is again moved toward the left in FIG. 1, thereby causing leftward movement of the workpieces placed into the channels 24. As these workpieces are moved toward the left, they will engage the plurality of workpieces which were sealed during the preceding sealing operation and bias these workpieces toward the left out of registry with the sealing bars 26. The limit switches 74 are arranged such that as the shuttle bar is initially moved toward the left, the piston and cylinder assembly 68 will be actuated to retract the stop bar 64, whereby the workpieces which are biased or pushed out of the machine 12 may freely move into engagement with the rollers 56 and 58, resulting in said workpieces being rapidly withdrawn away from the machine 12. As soon as these workpieces have been removed, the piston and cylinder assembly 68 will be reactuated to raise the stop bar 64 so that the subsequent workpieces being longitudinally positioned within the channels 24 may be moved into engagement with bar 64 and thereby aligned with the sealing bars 26. Subsequently, the shuttle bar 34 may be retracted or moved toward the right to permit loading of subsequent workpieces which are to be transferred to the machine 12 in the above described manner.

It will be seen from the foregoing that the present invention provides a novel workpiece transfer apparatus which will find particularly useful application in association with dielectric sealing machines of the type well known in the art. It will be appreciated, of course, that the apparatus 10 described herein is not limited to this particular application, since it is contemplated that said apparatus may find wide and varied application in transferring workpieces to various other types of machines or equipment for performing a manufacturing operation thereon. It will be noted that the present invention may be easily adjusted to handle a wide range of workpiece sizes, whereby to provide for universality of application. Another feature of the present invention resides in the fact that the apparatus 10 permits loading of the shuttle feeding mechanism 16 simultaneously with the sealing cycle of the associated dielectric machine, and that at no time is it necessary for the operator to come in contact with the sealing bars since the workpieces are fed into and removed from the associated machine through operation of the shuttle feeding mechanism 16 and pullout mechanism 18, as above described, thus assuring for operator safety.

While it will be apparent that the preferred embodiment illustrated herein is well calculated to fulfill the objects above stated, it will be appreciated that the present invention is susceptible to modification, variation and change without departing from the scope of the invention.

I claim:

1. In an apparatus for transferring workpieces to and from a machine having at least one dielectric sealing element for performing a dielectric sealing operation on the workpieces, means defining a generally horizontally arranged workpiece conveying path extending between said machine and a loading area located at one side of said machine and a discharge area located at the opposite side of said machine, said path being generally vertically aligned with the sealing element on the machine, shuttle means movable longitudinally of said path for transferring successive workpieces from said loading area to said machine, longitudinal movement of workpieces along said path in response to movement of said shuttle means causing preceding workpieces to be moved out of said machine toward said workpiece discharge area, and means for removing workpieces from said discharge area at a sufficiently fast rate to prevent interference with the transfer of successive workpieces thereto.

2. The invention as set forth in claim 1 wherein said machine comprises a plurality of longitudinally extending sealing bars, and which includes means defining a series of longitudinally arranged workpiece conveying paths aligned one with each of said sealing bars.

3. The invention as set forth in claim 1 which includes workpiece positioning means for selectively positioning workpieces in registry with the machine.

4. The invention as set forth in claim 3 wherein said workpiece positioning means is retractable out of registry with said path for permitting longitudinal movement of workpieces.

5. The invention as set forth in claim 1 which includes workpiece grounding means engageable with workpieces during a dielectric sealing operation by the machine.

6. The invention as set forth in claim 1 which includes a combination workpiece grounding and positioning means vertically reciprocably mounted along said path and adapted to be moved into registry with said path for positioning workpieces, and adapted to be moved out of registry with said path to permit removal of said workpieces from said machine.

7. The invention as set forth in claim 1 which includes means for rapidly removing workpieces from said machine.

8. The invention as set forth in claim 7 wherein said means for rapidly removing workpieces comprises roller means engageable with workpieces traversing said path.

9. The invention as set forth in claim 1 which includes a generally laterally disposed shuttle bar mounted for longitudinal sliding movement along said path, said shuttle bar including push rod means adjustably secured thereto and adapted for engagement with workpieces placed along said path, whereby longitudinal movement of said shuttle bar causes said push rod means to engage and bias workpieces longitudinally along said path.

10. The invention as set forth in claim 2 which includes a longitudinally reciprocable shuttle bar and a plurality of longitudinally extending push rod members secured to said shuttle bar and longitudinally aligned one with each of said paths, said push rods being operable to longitudinally bias workpieces along said paths in response to longitudinal movement of said shuttle bar.

11. The invention as set forth in claim 1 which includes a combination workpiece grounding and positioning means vertically reciprocably mounted along said path and adapted to be moved into registry with said path for positioning workpieces and adapted to be moved out of registry with said path to permit removal of said workpieces from said machine, means for rapidly removing workpieces from said machine, a longitudinally reciprocable shuttle bar and a plurality of longitudinally extending push rod members secured to said shuttle bar and longitudinally aligned one with each of said paths, said push rods being operable to longitudinally bias workpieces along said paths in response to longitudinal movement of said shuttle bar.

12. The invention as set forth in claim 11 which includes control means for selectively raising and lowering said workpiece positioning means in response to longitudinal movement of said shuttle bar.

13. In an apparatus for transferring workpieces to and from a machine including an operating element adapted to perform a manufacturing operation on the workpieces, means defining a workpiece transfer path extending from a leading area at one side of said machine to a discharge area at the opposite side of said machine, said path being generally vertically aligned with said element, shuttle means for moving workpieces longitudinally along said path into registry with said machine, longitudinal movement of workpieces along said path in response to movement of said shuttle means causing preceding workpieces to be moved longitudinally out of registry with said machine and toward said discharge area, and means at said discharge area for removing workpieces from said discharge area at a rate sufficient to prevent interference with the transfer of successive workpieces into registry with said machine.

14. The invention as set forth in claim 13 which includes workpiece positioning means operable in response to said shuttle means for selectively positioning workpieces in registry with machine.

15. The invention as set forth in claim 14 wherein said workpiece positioning means is retractable out of registry with said path for permitting longitudinal movement of workpieces.

16. The invention as set forth in claim 13 which includes roller means for rapidly removing workpieces from said machine.

17. The invention as set forth in claim 13 wherein said machine comprises a plurality of laterally spaced work performing elements, and which includes means defining a series of longitudinally arranged, laterally spaced workpiece conveying paths aligned one with each of said elements.

18. The invention as set forth in claim 13 which includes means defining a plurality of workpiece conveying paths, a retractable workpiece positioning means vertically reciprocably mounted along said paths and adapted to be moved into registry with said paths for positioning workpieces and adapted to be moved out of registry with said paths to permit removal of said workpieces from said machine, rotatable roller means for rapidly removing workpieces from said machine, a longitudinally reciprocable shuttle bar and a plurality of longitudinally extending push rod members secured to said shuttle bar and longitudinally aligned one with each of said paths, said push rods being operable to longitudinally bias workpieces along said paths in response to longitudinal movement of said shuttle bar.

* * * * *